United States Patent [19]

von Bonin et al.

[11] Patent Number: 4,694,030

[45] Date of Patent: Sep. 15, 1987

[54] INTUMESCENT POLYSILOXANE MOLDING COMPOSITIONS

[75] Inventors: Wulf von Bonin, Leverkusen; Hans Sattlegger, Odenthal; Harold Ebneth, Leverkusen, all of Fed. Rep. of Germany

[73] Assignee: Bayer Aktiengesellschaft, Leverkusen, Fed. Rep. of Germany

[21] Appl. No.: 3,999

[22] Filed: Jan. 16, 1987

[30] Foreign Application Priority Data

Jan. 31, 1986 [DE] Fed. Rep. of Germany ....... 3602888

[51] Int. Cl.[4] .......................................... C09K 21/14
[52] U.S. Cl. .................................... 523/179; 521/82; 521/154; 521/907
[58] Field of Search .................... 521/82, 154, 907; 523/179

[56] References Cited

U.S. PATENT DOCUMENTS

| | | | |
|---|---|---|---|
| 3,317,455 | 5/1967 | Blome et al. | 523/219 |
| 3,380,941 | 4/1968 | Dittman et al. | 523/179 |
| 3,429,838 | 2/1969 | Hersh | 521/154 |
| 3,553,002 | 1/1971 | Haraway, Jr. et al. | 523/219 |
| 3,654,190 | 4/1972 | Levine | 523/179 |
| 4,000,108 | 12/1976 | Yokokawa et al. | 523/219 |
| 4,031,059 | 6/1977 | Strauss | 523/179 |
| 4,072,635 | 2/1978 | Jerom | 523/219 |
| 4,077,921 | 3/1978 | Sharpe et al. | 523/179 |

*Primary Examiner*—Morton Foelak
*Attorney, Agent, or Firm*—Sprung Horn Kramer & Woods

[57] ABSTRACT

The present invention relates to intumescent polysiloxane molding compositions containing expandable graphite compounds and, if appropriate, additionally nitrogen-containing phosphates.

6 Claims, No Drawings

INTUMESCENT POLYSILOXANE MOLDING COMPOSITIONS

The present invention relates to intumescent polysiloxane molding compositions based on polysiloxane compositions which are known per se, which contain expandable graphite compounds, if appropriate in combination with nitrogen-containing phosphates.

Polysiloxane molding compositions, whether non-crosslnked or crosslinked, solid or foamed or foaming multicomponent or one-component systems, have been known for a long time for the production of filling materials or shaped articles, but in particular for the purpose of jointing building components (See, for example, British Patent Specification No. 1,064,930, French Patent Specification No. 1,439,025, DAS (German Published Specification) No. 1,167,020, U.S. Pat. No. 3,035,016, French Patent Specification No. 1,198,749, U.S. Pat. No. 3,296,161, U.S. Pat. No. 3,189,576, U.S. Pat. No. 3,189,079, U.S. Pat. No. 2,843,555, DAS (German Published Specification) No. 1,118,454, French Patent Specification No. 1,266,528, U.S. Pat. No. 3,161,614, German Patent Specification No. 1,247,646, German Patent Specification No. 1,258,087 and DE-OS (German Published Specification) No. 2,548,510).

Their good adhesion to mineral material and their good flexibility and elasticity within wide temperature ranges are valued.

Since the previous formulations with customary intumescent additives could not be used satisfactorily for foaming with flaming (intumescence) with simultaneous suppression of the undesirable burning properties, the demand for intumescent polysiloxane molding compositions which can be used for the purposes of fire protection continues unabated.

The present invention relates to polysiloxane molding compositions, which are characterized in that they contain expandable graphite compounds and, if appropriate, additionally nitrogen-containing phosphates.

It has now been found that polysiloxane molding compositions, even if they are highly crosslinked when used, can still be made to expand very well when flamed, if expandable graphite compounds, that is to say granular graphite compounds which expand to several times their starting volume when exposed to temperatures above about 100° C., are added to them.

Such graphite compounds in which the interstitial planes of the graphite contain deposits which impart expandability have been known for a long time and are also used for the purpose of fire protection. They can be obtained, for example, by oxidation, nitrosation, sulphidation, phosphation, hydrogenation and halogenation of various graphite types and grain structures, expanded graphites based on nitrosated graphites having proved particularly suitable.

Surprisingly, customary intumescent agents, such as, for example, combinations of ammonium phosphates, carbohydrates and aminoplasts, are virtually unsuitable for producing intumescences in polysiloxane molding compositions of the formulations customary in industry. On the other hand, even highly crosslinked silicone molding compositions can be given outstanding intumescence properties by addition of expanded graphite.

It has furthermore been found that the addition of expanded grahite, although this is not said to have flame-retardant properties from the chemical point of view, noticeably reduces the combustibility of polysiloxane molding compositions finished with this material.

It has furthermore been found that this combustibility is evidently reduced synergistically if the addition of expanded graphite is combined with the addition of nitrogen-containing phosphates, such as, for example, ammonium phosphates, or polyphosphates, such as, for example, ammonium polyphosphate, or melamine phosphate, but in particular ethylenediamine phosphate or polyphosphate.

Thus, the addition of about 20% by weight of an ammonium (poly)phosphate or a comparable amount of expanded graphite has a relatively low action on the afterburning of a silicone molding composition, once ignited, whilst a combination of 20% by weight of ethylenediamine phosphate and 20% by weight of nitrosated expanded graphite surprisingly prevents afterburning.

Polysiloxane moulding compositions are understood as polysiloxane resins or rubbers, and comparable products based on silicone, which can be shaped before any crosslinking or are dimensionally stable after any crosslinking and are preferably flexible. They are preferably alkylpolysiloxanes, in particular methyl polysiloxanes, of the type known in industry, such as, modified by reactive groups, for example silanol, SiH or vinylsilane groups, have been used for a relatively long time in the form of non-crosslinked or crosslinked silicone rubbers, multi-component systems and, in particular, one-component compositions or molding compositions which crosslink with constituents of the atmosphere, for example water vapor and are well-known to the expert, for example under the designations amine system, oxime system, acetate system or benzamide system. However, aryl- or alkyl-silicone types or types containing silicic acid ester groups are also possible. Known one- or multicomponent systems based on silicone, which react with simultaneous crosslinking and expansion of propellant gases, for example $CO_2$, $N_2$, air or hydrogen, to give foams are furthermore of interest.

Expandable graphite compounds are understood as those graphite types which expand on warming to temperatures above 100° C. These include, for example, oxidized, halogenated and nitrosated graphites, which are included amongst the so-called graphite compounds such as are listed, for example, in Rmömpps Chemie Lexikon (Römpps Chemical Dictionary) (8th edition) or U.S. Pat. No. 3,574,644. These are graphites in which the interstitial layers contain deposits of foreign groups which effect thermal expansion. Because they are readily accessible, nitrosated graphites with a particle size of above 0.25 mm (average maximum diameter) are preferably used. If appropriate, other expanding agents can be used in addition to expandable graphite compounds, in particular those which split off nitrogen, such as azodicarboxamide, benzenesulphonic acid hydrazide, p-toluenesulphohydrazide, diphenyl oxide-4,4'-disulphohydrazide, benzene-1,3-disulphohydrazide and/or N,N'-dinitrosopentamethylenetetramine.

The polysiloxane molding compositions which, according to the invention, are to contain the graphite compounds contain them in amounts of 0.1 to 50, preferably 3 to 30, % by weight, based on the total amount. In addition, they can furthermore also contain the other customary fillers used in silicone compositions, such as carbon black, graphite, silicic acid, metals, such as, for example, Pb, Fe, Al, Ag, Cu, Pt and Zn, and oxides thereof, or chalks, dolomite, ferrites, kaolins, fluorite, rock powders, Al hydroxides, polymeric fillers, such as, for example, Teflon ®, and colored pigments or fibres.

Ammonium phosphates and polyphosphates are understood as salts of phosphoric acids, such as, for example, ortho-, pyro-, meta- and polyphosphoric acid, phosphonic acids or phosphinic acids with basic nitrogen compounds; for example ammonia, melamine or ethylenediamine. Phosphates and polyphosphates of ammonia, melamine and ethylenediamine are particularly suitable, in particular because of their relatively low water-solubility.

A particularly good activity has been found with ethylenediamine phosphate (neutral).

The ammonium (poly)phosphates are employed in amounts of 3 to 50, preferably 10 to 40, % by weight (based on the total weight). It is also possible to use liquid phosphates, some of which act as plasticizers, for example esters, such as the methyl or ethyl esters of methyl-phosphonic acid or the phosphoric acid esters known as plasticizers, for example diphenyl cresyl phosphate, instead of or in addition to the salt-like phosphates. These liquid phosphates are also used in amounts of 0.5 to 25, preferably 3 to 10, % by weight (based on the total composition). These additives improve the consistency of the silicone compositions in the direction of improved processability by nozzle discharge equipment.

The formulations according to the invention are prepared by mixing the additives at temperatures below 120° C. before any hardening or crosslinking process to be carried out. In the case of multi-component systems, one and/or both components can contain the additives according to the invention, it being of course necessary, depending on the system or additive component, to test the compatibility or storage stability. The latter also applies to one-component systems which crosslink with components of the atmosphere.

The silicone molding compositions or cementing compositions according to the invention can be used as shaped articles, films and coatings or as joint fillings and ballast materials; and in the case of foamed products also relatively inexpensively in hollow cavity fillings. In the event of fire, due to the intumescence properties and the reduced flammability, an insulating and protective function against the conduction of fires arises from the building components protected with the novel silicone compositions, for example cable channelling through fire walls, cable lines, joint sealings on wall elements, valve casings and closing devices which seal pipes or shafts via intumescence on heating, whether by pressing together or filling and the like.

The trial and test methods which have been used to evaluate the intumescence action are described below. Fire tests and evaluations:

A circular strand of 5 mm $\phi$ is produced from the silicone compositions and, after any hardening, is placed on a wire mesh channel. The test sample projects 1 cm beyond the wire mesh channel (mesh diaMeter about 2 mm). The non-luminous flame of a natural gas Bunsen burner is then brought under the sample so that the blue cone of the flame is about 3 mm below the point where the boundary between the wire mesh and unsupported part of the sample is located. After flaming for 60 seconds, the flame is extinguished and the afterburning is observed:

| Evaluation | Rating | Intumescence |
|---|---|---|
| no afterburning | 1 1 | more than 300% by volume |
| afterburning for up to 3 seconds | 2 2 | 200–300% by volume |
| afterburning for up to 10 seconds | 3 3 | 100–200 by volume |
| afterburning for more than 10 seconds | 4 4 | 0–100% by volume |

After 30 seconds, the burner flame is ignited again and the sample is flamed for a further 180 seconds.

The intumescence and afterburning are in each case evaluated and rated after the first and second ignition. The increase in cross-section above the centre of the flame is used to evaluate the intumescence.

Joint testing is carried out in a small burning chamber which is operated in accordance with DIN 4102 and is heated according to the standard temperature curve (ETK), on a joint, filled with the silicone material, between two foamed concrete components. The joint is 1.5 cm wide and 3 cm deep. The time which elapses until either the joint has permitted burning gas to pass out of the burning chamber or has a temperature of more than 150° C. on the side facing away from the fire is determined. The time determined is called the failure time.

The present invention may be illustrated in more detail with the aid of the following test examples (% data are % by weight):

EXAMPLE 1

A commercially available polysiloxane molding composition (1-C system) according to German Patent Specification No. 1,258,087, Example 3, which crosslinks with atmospheric moisture and contains no additives according to the invention.

EXAMPLE 2

A polysiloxane composition according to Example 1, but with additionally 50% by weight (based on the molding composition) of ethylenediamine phosphate (particle size less than 0.1 mm in diameter)

EXAMPLE 3

According to Example 1, with 35% of ethylenediamine phosphate and 15% of nitrosated Ceylon graphite (N content about 1.5%).

EXAMPLE 4

According to Example 3, with additionally 10% (in each case based on the polysiloxane composition) of dimethyl methylphosphonate.

EXAMPLE 5

Paste consisting of high molecular weight polydimethylsiloxane (penetrometer value (according to Klein) 150) with 12% of pyrogenic silicic acid. Addition of 30% of ethylenediamine phosphate and 20% of the graphite compound according to Example 3.

EXAMPLE 6

Polysiloxane composition according to Example 1, but with 7.5% of graphite according to Example 3 and 22.5% of melamine phosphate.

EXAMPLE 7

As Example 6, but ammonium polyphosphate instead of melamine phosphate.

EXAMPLE 8

As Example 6, but ethylenediamine phosphate instead of melamine phosphate.

EXAMPLE 9

Commercially available foaming system (2-component, "Fire Stop" from Dow Corning, USA) is mixed and, after mixing, 15% of graphite from Example 3 and 10% of ethylenediamine phosphate are added and the mixture is stirred. This mixture is poured into a polyethylene tube with an internal $\phi$ of 5 mm, being foamed to a circular strand with a bulk density of about 0.5 g/cm$^3$. Freely foamed mixtures achieved bulk densities of less than 0.3 g/cm$^3$.

EXAMPLE 10

As 9, but without the addition of phosphate.

EXAMPLE 11

As 3, but without the addition of phosphate.

EXAMPLE 12

A commercially available polysiloxane moulding composition (1-C system) according to German Patent Specification No. 1,258,087, Example 3, with additives as described in Example 4.

| Example | 1st afterburning | 1st intumescence | 2nd afterburning | 2nd intumescence | Failure time (minutes) |
|---|---|---|---|---|---|
| 1 | 4 | 4 | 4 | 4 | 21 |
| 11 | 2 | 2 | 2 | 1 | 40 |
| 2 | 2 | 3-4 | 2 | 3 | 48 |
| 3 | 1 | 2 | 1 | 1-2 | 82 |
| 4 | 1 | 1-2 | 1 | 1-2 | 69 |
| 5 | 2 | 3 | 1-2 | 1 | 58 |
| 6 | 3 | 3 | 3 | 2 | 54 |
| 7 | 2 | 3 | 3 | 2-3 | 59 |
| 8 | 2 | 3 | 2 | 2 | 73 |
| 9 | 1 | 2-3 | 1 | 2 | 128 |
| 10 | 1 | 3 | 1-2 | 2 | 100 |
| 12 | 1 | 1 | 1-2 | 1-2 | 74 |

What is claimed is:

1. An intumescent polysiloxane molding composition, comprising a polysiloxane molding composition and an expandable graphite compound.

2. A molding composition according to claim 1, wherein said graphite is a nitrosated graphite.

3. A molding composition according to claim 1, which further comprises a nitrogen-containing phosphate.

4. A molding compositions according to claim 3 wherein the nitrogen-containing phosphate is an ethylenediamine phosphate.

5. A molding composition according to claim 1 which further comprises a phosphoric acid ester and/or a phosphonic acid ester.

6. A molding composition according to claim 3 which further comprises a phosphoric acid ester and/or a phosphonic acid ester.

* * * * *